United States Patent Office 3,544,198
Patented Dec. 1, 1970

3,544,198
UNITARY DIOPTRIC LENS
Jean de Metz, Colombes, and Francois Millet, Paris, France, assignors to Commissariat a l'Energie Atomique, Paris, France
Filed Nov. 5, 1968, Ser. No. 773,390
Claims priority, application France, Nov. 8, 1967, 127,473
Int. Cl. G02b 3/04
U.S. Cl. 350—189                    4 Claims

ABSTRACT OF THE DISCLOSURE

A lens for concentrating at its focus parallel light beam from a laser, has a plane exit face and an aspheric entrance face of revolutions whose shape provides minimum degree of coma. This lens is formed with an axial polished wall hole which opens at least in the exit face of the lens. The depth of this hole is sufficient for it to be traversed by the light rays which are reflected successively by the exit face and entrance face of the lens. The lens may have an annular lens surrounding a central lens with an aspheric entrance face which projects from the front face of the first central lens to a distance such that the light rays which are successively reflected from the exit face and from the entrance face are focused outside the lenses.

---

The invention relates to a dioptric system which is intended to concentrate at its focus a beam of substantially parallel rays of monochromatic light, said system being intended for use especially for the purpose of producing a high intensity of light at its focus when it is illuminated by a flash produced by a pulsed laser; the invention is also directed to a method of manufacture of systems of this type.

In order to obtain the maximum light intensity in the case of a given entering luminous flux, a certain number of properties are required of the dioptric system—it must not exhibit any spherical aberration, it must have a negligible degree of coma, at least in the small field required (of the order of one degree in the case of illumination by laser beam) and it must be substantially anastigmatic. Moreover, the system must be such that there does not take place within the mass of dioptric material an energy concentration which is liable to result in its fracture. Finally, it is readily apparent that the shape of the faces of the system must be such that manufacture and testing remain possible.

A certain number of solutions to the problems mentioned above has already been proposed but none has proved fully satisfactory. On the one hand, objectives comprising more than two lenses with spherical faces have been employed; but there is absolute incompatibility between complete correction for objectionable aberrations and the need to maintain a small number of lenses in order to provide the system with sufficient resistance to disintegration at the time of triggering of the laser. On the other hand, it has been proposed to make use of a single meniscus lens of substantial thickness having either an exit face which has a hyperbolic section and a plane entrance face or alternatively an ellipsoidal entrance face and spherical exit face—a lens of this type has high breaking strength but nevertheless suffers from serious defects. Thus, in the case of a lens in the form of a meniscus which has a spherical exit face, if the axis of the laser is caused to coincide with the axis of the spherical cap in order to produce satisfactory focusing at the center of the sphere, the flux which is reflected towards the front from the rear face is liable to destroy the laser. If the lens is inclined to the axis of the laser in order to circumvent this disadvantage, coma becomes excessive and reduces both the light intensity and the energy density at the focus to a very considerable extent. So far as plano-hyperbolic meniscus lenses are concerned, they have for the same reason one face which is inclined at a very large angle to the rays produced by the laser and have a very high degree of coma which robs them of any interest.

The aim of this invention is to correct the defects of the solutions of the prior art, especially by providing a dioptric system which is practically free from coma with in a sufficiently wide field angle (from 0.5 to 1°, for example) and which retains the resistance of ellipsoido-spherical lenses to high fluxes even in the case of a wide aperture while nevertheless permitting of easy manufacture and testing.

To this end, the invention proposes a dioptric system comprising a lens having a plane exit face and an aspheric entrance face of revolution whose profile corresponds to a minimum degree of coma, said lens being pierced along its axis by a hole which opens at least in the exit face of the lens and which has a polished wall, the depth of said hole being such that it is traversed by the rays which are reflected successively from the exit face and entrance face of the lens.

The invention also proposes a method of manufacture of a system of this type in which the starting element is a lens blank of plano-spherical shape, the spherical face of which is tangent to the entrance face to be formed at the vertex of the lens and the spherical face is cut by means of a milling-cutter which is displaced from the center up to the edge of the lens and driven by a cam rolling on a template which is homothetic with the directrix to be formed in a high ratio which is advantageously of the order of 100:1.

The invention further proposes a method of manufacture of a system of this type which is intended to operate in the infrared region of the spectrum. According to this method, a first lens is made with a shape which is identical with the shape of the final lens but from a material whose refractive index in visible monochromatic light has the same value as the refractive index possessed in the infrared region by the material which is intended to be used in the real system; said first lens is tested in visible monochromatic light; and the infrared lens is prepared by molding by virtue of the optical identity between the two lenses. It is thus apparent that, if a test carried out on the first lens by inspection in visible light shows that this lens is satisfactory, the second lens will be correct for the infrared region.

A better understanding of the invention will be obtained from the following description of modes of application which are given by way of example and not by way of limitation. The description refers to the accompanying drawings, in which.

Figure 3:
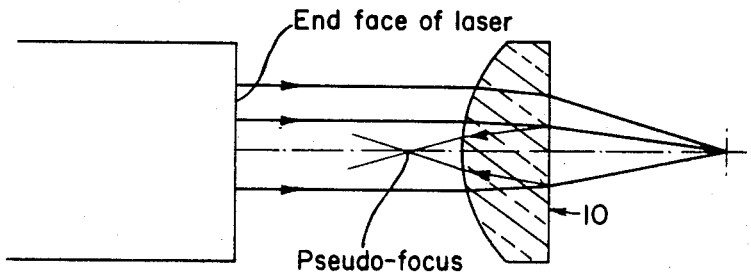
FIG. 3 is a schematic representation of the relative positions of the lens of FIG. 1 and of a pulsed laser.
Figure 1:
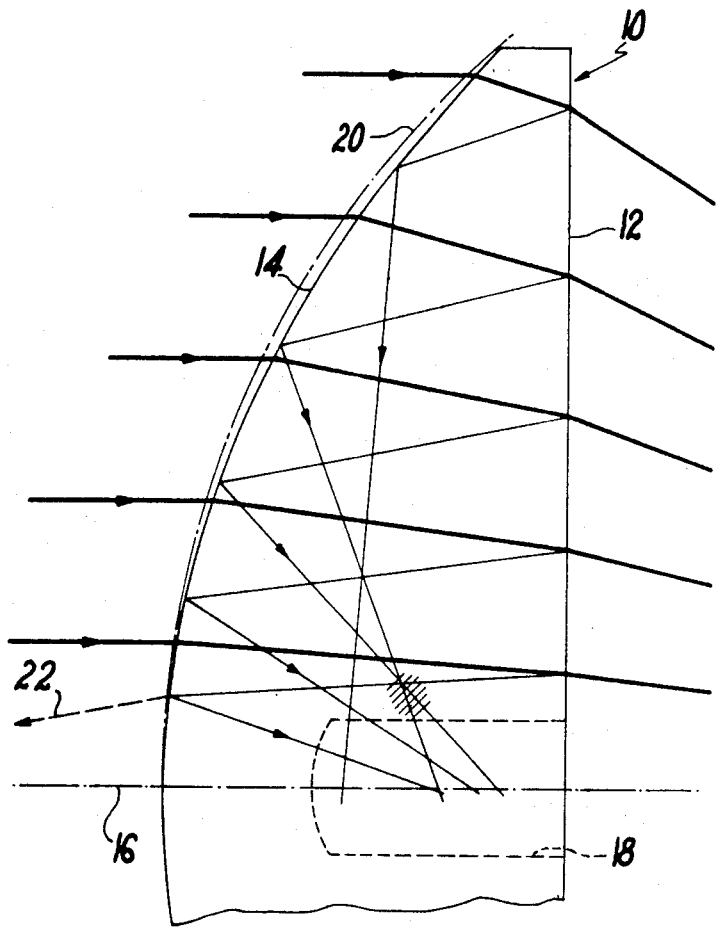
FIG. 1 shows a plano-aspheric lens in accordance with the invention as shown in axial cross-section, the plano-spheric lens which serves as a blank being shown in chain-dotted lines.

The lens 10 which is illustrated in FIG. 1 has a plane exit face 12 and an aspheric entrance face 14 of revolution about the optical axis 16 of the system. The director-curve of the front surface is determined by calculation on the basis of two types of conditions:

(1) On the one hand, it is essential to satisfy the classical equations which are representative of the conditions to be met, and in particular the following conditions:

the incident rays are parallel to the axis at each point of the entrance face;

the refraction within the two refracting surfaces (entrance face and exit face) complies with the law of Descartes;

the points at which a light ray passes through the entrance and exit refracting surfaces are determined by the relative geometrical arrangement of the two faces and the inclination of the ray;

the entrance face is continuous, thereby supplying a relation between the angle of incidence of said light ray at a given point of the entrance face and the tangent in profile of the face at this point;

finally, spherical aberration must be zero.

(2) On the other hand, the conditions of utilization which are contemplated or necessary in practice must be met—the aperture must be of the order of $f/1$ at a minimum; the thickness of the lens at the edge must be fairly substantial in order to make it possible to secure the lens in a support at the time of cutting, polishing and then to mount said lens within its casing while at the same time being sufficiently small to ensure that the concentration of the beam of light rays in the lens does not result in excessive density of energy at the level of the exit face; the refractive index must be that of a glass which has good resistance to the flux of a laser.

When all the above requirements are satisfied, calculations are carried out in the form of an optimization in order to reduce coma to its minimum value; the directrix of the entrance face is plotted point by point by means of a digital computer.

It should be noted in this connection that comatic aberration could theoretically be reduced to zero by means of a lens with two aspheric faces. However, it is not possible in practice to manufacture a lens of this type with the requisite degree of accuracy, particularly by reason of the absence of a reference plane surface of spherical surface.

The calculation which has thus been made has resulted in a lense having the following main characteristics:

thickness—0.25 $f$ ($f$=focal distance)
refractive index—1.622
distance from the exit face to the focus—0.848 $f$.

A lense of this type has an aperture of $f/1$; the field angle through which the lens can be rotated in order that the light intensity at the focus should be equal to $\frac{4}{5}$ of the intensity produced by a perfect system limited solely by diffraction is 0.9° for a local length of 50 mm.

In fact, it has been found that this lens has a thickness at the edge which is insufficient to secure it firmly and that the known glasses having a refractive index of 1.622 do not have sufficient resistance to high fluxes emitted in the infrared region by a pulsed laser. On these grounds, it has been found necessary to retain the following slightly different values in the case of a lens which has actually been manufacture:

thickness—0.29 $f$
refractive index—1.607
distance from exist face to focus—0.825 $f$.

The entrance and exist faces are advantageously coated with non-reflecting films.

The field angle which is defined in the foregoing is still 0.6°, which is sufficient. There is relatively little change in the field angle in respect of variations of a few units per thousand in the different parameters.

The lens 10 as hereinabove defined would disintegrate during the first light pulses emitted by a high-power laser by reason of the concentration of the light rays which have undergone reflection from the exit face followed by a further reflection from the entrance face (this latter being almost total in the case of the marginal rays) along the path shown in thin lines in the figure.

Practical tests have shown that, when the first light pulse was initiated, a large bubble appeared in the glass. This bubble spread further when the second light pulse took place. The third pulse resulted in fragmentation of the lens.

This defect has been removed by forming within the lens 10 an axial hole 18 which has its opening at least in the exit face 12. Said hole is empty and has polished walls since it has been observed that this condition improves the resistance of the lens to a marked degree. The reflections from the walls of the hole are sufficiently imperfect to ensure that there is no danger of energy concentration. The hole 18 has either a blind end (as shown in FIG. 1) or is open at both ends. The second solution has the disadvantage of allowing a fraction of the laser beam to pass through directly. In the case of a blind-end hole, the depth of the hole must be greater than one-half the thickness of the lens: a depth of the order of $\frac{2}{3}$ of the thickness is usually satisfactory.

In the case of an aperture of the order of $f/1$, it may be postulated that the hole must have a diameter between $\frac{1}{8}$ and $\frac{1}{20}$ of the focal distance—a ratio of the order of $\frac{1}{10}$ usually provides satisfactory results; the edge of the hole becomes slightly impaired but the damage does not spread.

The following indications which are given by way of example correspond to a lens which has actually been manufactured:

thickness—14.5 mm.
refractive index—1.608
focal distance—50 mm.
external diameter—52 mm.
useful diameter of entrance—50 mm.
diameter of hole—6 mm.
depth of hole—10 mm.

The lens thus formed possesses in the infrared region and in respect of a wavelength of the order of $1\mu$ a field angle of 0.6° for which coma is corrected within the limits mentioned earlier.

It is possible to depart slightly (by a few microns at the edge of the lens) from the shape which is given by calculation in such manner as to correct the imperfections of the laser which produces a very slightly divergent beam of light rays.

During tests, this lens has been associated with a laser which produces 60 joules in 30 nsecs. The lens transmitted this energy without sustaining any damage other than limited degradation in the shaded zone in FIG. 1. This degradation takes place when the first light pulses are produced and does not spread.

A few precautions must be taken when associating a lens of this type with a laser. It must in fact be noted that the central light rays which have undergone partial reflection from the exit face of the lens are not totally reflected from the entrance face—a fraction is refracted and returns towards the laser (ray 22 which is shown in broken lines in the figure) and produces pseudo-focusing at a point located a few centimeters in front of the lens. It is necessary to place the exit face of the laser at a sufficient distance away from the entrance face of the lens in order to prevent breakdown of the laser. In practice, it can be estimated that the distance between the laser and the entrance face of the lens must be at least double the distance between the entrance face and the pseudo-focus (approximately 30 mm. in the case which is contemplated above).

The lens can be manufactured by cutting and polishing from a blank with a plane rear face which is trued and polished and a front hemispherical face 20, the thickness of the polished blank being equal to that of the lens 10 to be formed and the radius of the sphere being such that there is a minimum amount of material to be removed. Cutting and polishing of the lens are advantageously carried out by means of the machine described in the article by J. P. Marioge entitled "Etude d'une Machine Pour la Realisation de Surfaces Aspheriques" (Study of Machine for Forming Aspheric Surfaces) published in the Revue d'Optique, vol. 44, No. 2, pp. 57–88 (February 1965). This machine comprises an end-mill for cutting the lens and driven by displacement of a runner-wheel on a guide cam. By employing between the cam and the lens a step-down ratio of the order of 100:1 and by reducing play, the lens is rough-formed to within approximately $0.5\mu$. A flexible polishing rubber is then applied against the surface which has been cut by the machine.

After manufacture, the lens must be tested and the best method for this consists of interferometric inspection. This method of inspection is relatively easy when the lens is intended to operate in the visible spectrum since lasers of the type which give continuous action and operate in this region of the spectrum are available. On the other hand, if the lens is intended to operate in conjunction with a pulsed laser which operates in the infrared, continuous-action lasers are not always available for the corresponding wave-length and testing becomes difficult. One solution consists in forming a first lens from a material whose refractive index in visible monochromatic light has the same value as the material which is to be employed with the pulsed laser at the infrared wavelength of said laser; there is in that case optical identity between the two lenses. Once the lens which is intended to be employed in the visible region has been checked, it only remains to mold to the same shape the lens which is to be utilized in the infrared region.

The system which is illustrated in FIG. 1 gives satisfactory results as long as an aperture of approximately $f/1$ is not exceeded. Beyond this value, the caustic surface of the light rays which are reflected successively from the exit face and from the entrance face of the lens extends too far from the axis in the radial direction to provide the central hole with a diameter of sufficient magnitude to ensure that the level of illumination of the hole-wall is compatible with the strength of the glass which constitutes the lens—a diameter of this order would in fact result in excessive losses.

Figure 2:
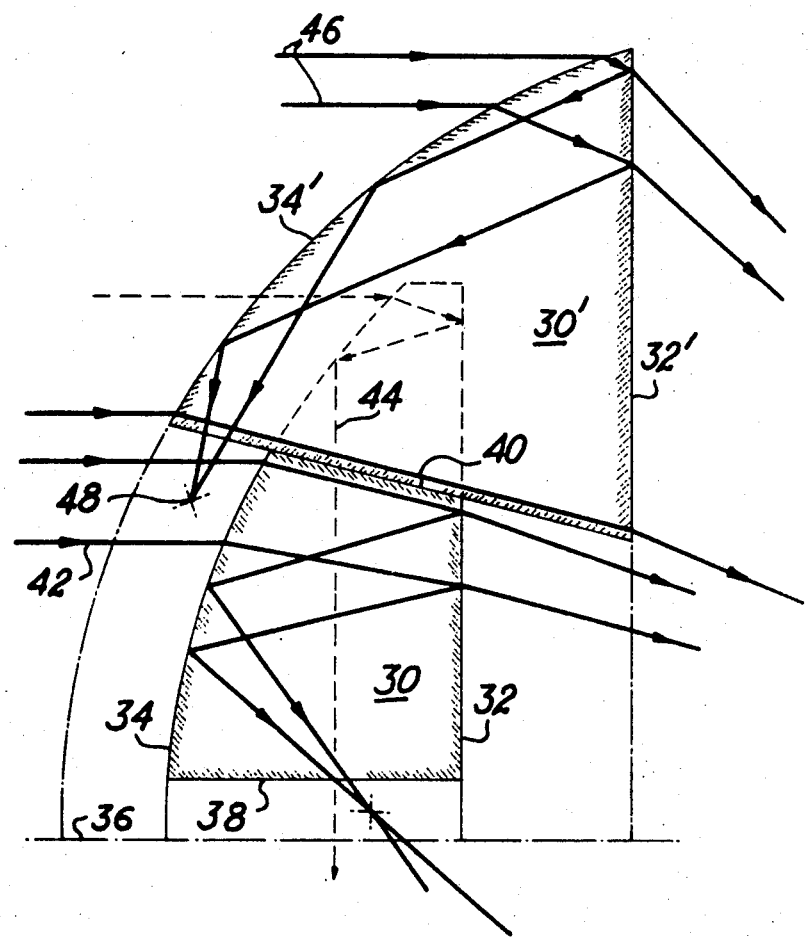
FIG. 2 shows a set of two concentric lenses constituting another mode of application of the invention.

The mode of application which is illustrated in FIG. 2 removes this limitation—the dioptric system in which only two spherical refracting surfaces are again placed on the path of the light beam comprises a central lens 30 of the type illustrated in FIG. 1 and having an aperture which is equal at a maximum to $f/1$, said central lens being surrounded by a second lens. Said second lens 30' is annular, also has a plane exit face 32' and an aspheric entrance face 34' and extends beyond the front face of the central lens to a distance such that the light rays which are successively reflected from the exit face and from the entrance face of the annular lens are brought to a pseudo-focus outside the central lens 30.

The two lenses can be formed in one piece in a general arrangement which bears some resemblance to that of Fresnel lenses but it is usually preferable to manufacture them separately and cement them together. The contact surface must then have the shape of a cone having an angle at the vertex which corresponds to the inclination of the rays of the beam within the glass in proximity to said surface.

Apart from the essential advantage mentioned above, the arrangement in accordance with FIG. 2 makes it possible to reduce to a substantial extent the thickness of the central lens 30 in respect of a given aperture by causing the annular lens 30' to project both in the forward and backward directions.

The central lens 30 which is illustrated has a plane exit face 32 and an aspheric entrance face 34 of revolution about the optical axis 36 of the system. The characteristics of a lens 30 which has been manufactured with a view to focusing a beam produced by a laser which operates in the infrared region are given by way of example as follows:

thickness along the axis—$0.2775\ f$ ($f$=focal distance)
back focal length—0.8285
refractive index—1.618
aperture—$f/1.5$ This lens had a central hole 38 which extended right through the lens; in the case which is contemplated above, said hole had a diameter of 5 mm. for a focal distance of 50 mm. The lens referred-to had a shape which was identical to the lens having an aperture of $f/1$ as shown in FIG. 1 but was truncated at its periphery in the form of a conical surface in order to eliminate the zone defined in broken lines.

The annular lens 30' which is placed around the lens 30 brought the aperture of the system to $f/0.7$ and had the following parameters:

theoretical thickness along the axis—$0.545\ f$.
back focal length—0.663
refractive index—1.618.

As shown in the figure, the contact surface 40 between the lenses 30 and 30' has a conicity such that the light rays which pass through the glass in proximity to the surface are parallel thereto.

Centering of the lenses must obviously be carried out with a high degree of accuracy—it is possible in particular to utilize the method of Foucault which consists in placing in the vicinity of the focus a blade whose edge intersects some of the rays of the light beam. If the eye is placed behind the obstacle constituted by the blade, the exit pupil of the dioptric system can be observed. Those zones of the pupil which have a focal point beyond the blade exhibit a dark portion on the same side as the blade and a bright portion on the opposite side. It is thus possible to study the beam transmitted by one lens in order to determine its focus and then the other by adjusting this later—when the two beams are obturated by the blade in the same manner, the two foci are located on the edge of the blade. After centering, the two lenses are stationarily fixed with respect to each other in the ordinary manner.

In order to illustrate the essential advantage provided by the arrangement in accordance with the invention, a series of light rays which form part of the parallel entrance beam of monochromatic light have been shown in FIG. 2 by way of example—the inner lens 30 works in the same manner as the lens 10 according to FIG. 1 and exhibits the same properties. However, by reason of the fact that said inner lens is truncated at its periphery, the caustic surface formed by the rays 42 which pass through said lens extends to a shorter distance from the axis; for a same diameter of the central hole 38, an appreciably smaller amount of power is dissipated within the glass in proximity to said hole along the caustic surface. Even the rays which traverse the marginal zone of the lens 30 and are reflected successively from the exit face 32 and entrance face 34 are brought to a pseudo-focusing zone within the hole 38. By way of comparison, it is apparent that a light ray 44 (as shown in broken lines) which would correspond to the removed peripheral portion of the lens 30 would result in pseudo-focusing within the glass.

In regard to the light rays which pass through the lens 30', said rays also form a caustic surface but the greater part of this latter is located outside the glass—in particular, the marginal rays such as the ray 46 which are reflected successively from the exit face 32' and entrance face 34' give rise to pseudo-focusing at 48 in front of the lens 30 and outside the lens 30'.

In conclusion, it is apparent that in the case of a given aperture of the system, the arrangement in accordance with FIG. 2 reduces the quantity of energy which is dissipated with the glass as a result of pseudo-focusing of rays reflected from the faces of the system and, correlatively, permits said system to transmit higher light energies with a central hole with has a small diameter and which therefore gives rise only to small losses. Thus, it can be noted by way of example that the transition from the arrangements described in FIG. 1 to the arrangement described in FIG. 2 has made it possible to change from an aperture of $f/1$ to an aperture of $f/0.7$ and to transmit an energy of 120 j. instead of 80 j. in 30 nsecs. without resulting in destruction of the lens after a large number of light pulses emitted by the laser.

In principle, there is no objection to providing the optical system with more than two concentric lenses and it is self-evident that this variant as well as any other alternative form which remains within the definition of equivalent means is covered by this patent.

What we claim is:

1. A centered dioptric system for concentrating at its focus a beam of substantially parallel rays of monochromatic light, comprising a lens having a plane exit face and an aspheric entrance surface of revolution whose profile provides minimum coma, said lens being pierced along its axis by a hole which opens in the exit face of said lens and which has a polished wall, the depth of said hole being greater than one half the thickness of said lens and less than the entire thickness of said lens and such that it is traversed by the light rays initially parallel to the axis of said lens which are successively refracted by the entrance face, reflected by the exit face and reflected by the entrance face of said lens, said lens having an aperture which is equal at a maximum to $f/1$ and the diameter of said hole being between $f/20$ and $f/8$.

2. A centered dioptric system for concentrating at its focus a beam of substantially parallel rays of monochromatic light comprising a lens having a plane exit face and an aspheric entrance surface of revolution whose profile provides minimum coma, said lens being pierced along its axis by a hole which opens at least in the exit face of said lens and which has a polished wall, the depth of said hole being such that it is traversed by the light rays which are reflected successively from the exit face and entrance face of said lens comprising in addition to the first lens an annular lens surrounding said first lens and also having a plane exit face and an aspheric entrance face which projects from the front face of the first central lens to a distance such that the light rays which are successively reflected from the exit face and from the entrance face of the annular lens are brought to a pseudo-focus outside the lenses.

3. A dioptric system in accordance with claim 1, wherein the lenses are in contact by means of a conical surface having an angle at the vertex which corresponds to the inclination of the rays of the light beam within the lenses in proximity to said surface.

4. A device for the production of intense illumination comprising a dioptric system in accordance with claim 1 and a pulsed laser disposed along the optical axis of said system, wherein the terminal face of the laser is located at a distance from the entrance face of the lens which is greater than the distance between said lens and the pseudo-focus resulting from the rays which are successively reflected from the exit face and refracted by the entrance face of the lens.

References Cited

UNITED STATES PATENTS 3,442,566   5/1969   Forward et al. _____ 350—3.5

FOREIGN PATENTS 23,491   10/1909   Great Britain.

DAVID SCHONBERG, Primary Examiner

P. A. SACHER, Assistant Examiner

U.S. Cl. X.R.

350—197